United States Patent [19]
McMahon et al.

[11] Patent Number: 6,095,543
[45] Date of Patent: Aug. 1, 2000

[54] RIDING TOYS AND COMPONENT PARTS THEREOF

[75] Inventors: Daniel P. McMahon, Denville; Michael P. Albarelli, Jr., Chester, both of N.J.

[73] Assignee: Amloid Corporation, Saddle Brook, N.J.

[21] Appl. No.: 09/019,756

[22] Filed: Feb. 6, 1998

[51] Int. Cl.$^7$ ...................................................... B62K 5/06
[52] U.S. Cl. ...................... 280/282; 280/288.3; 301/64.7; 301/64.5
[58] Field of Search .................................. 301/111, 64.7, 301/64.5; 280/281.1, 282, 288.3; 52/729.1, 630

[56] References Cited

U.S. PATENT DOCUMENTS

| | | | |
|---|---|---|---|
| 1,320,072 | 10/1919 | Long ........................................ | 52/729.1 |
| 3,807,474 | 4/1974 | Wendt et al. ........................... | 301/111 |
| 4,147,379 | 4/1979 | Winslow .................................. | 280/781 |
| 4,170,384 | 10/1979 | Rotheiser ................................ | 301/64.7 |
| 4,832,098 | 5/1989 | Palinkas et al. ............................ | 152/7 |
| 5,765,871 | 6/1998 | Wyman et al. .......................... | 280/827 |
| 5,769,442 | 6/1998 | Robinson et al. ....................... | 280/288.3 |

*Primary Examiner*—Brian L. Johnson
*Assistant Examiner*—Avraham H. Lerner
*Attorney, Agent, or Firm*—Arthur Jacob

[57] ABSTRACT

A riding toy shown in the form of a tricycle in which major component parts are configured for manufacture by injection molding of a synthetic polymeric material, the major component parts including a front wheel having webs, ribs and flanges arranged for injection molding in one piece, a frame having a web, ribs and flanges arranged for injection molding in one piece, and rear wheels arranged for injection molding in two readily assembled unitary members. The tricycle includes a skid on the frame adjacent the rear wheels for preventing the tricycle from flipping over backwards during rearward rotating movements induced by the rider of the tricycle.

37 Claims, 11 Drawing Sheets

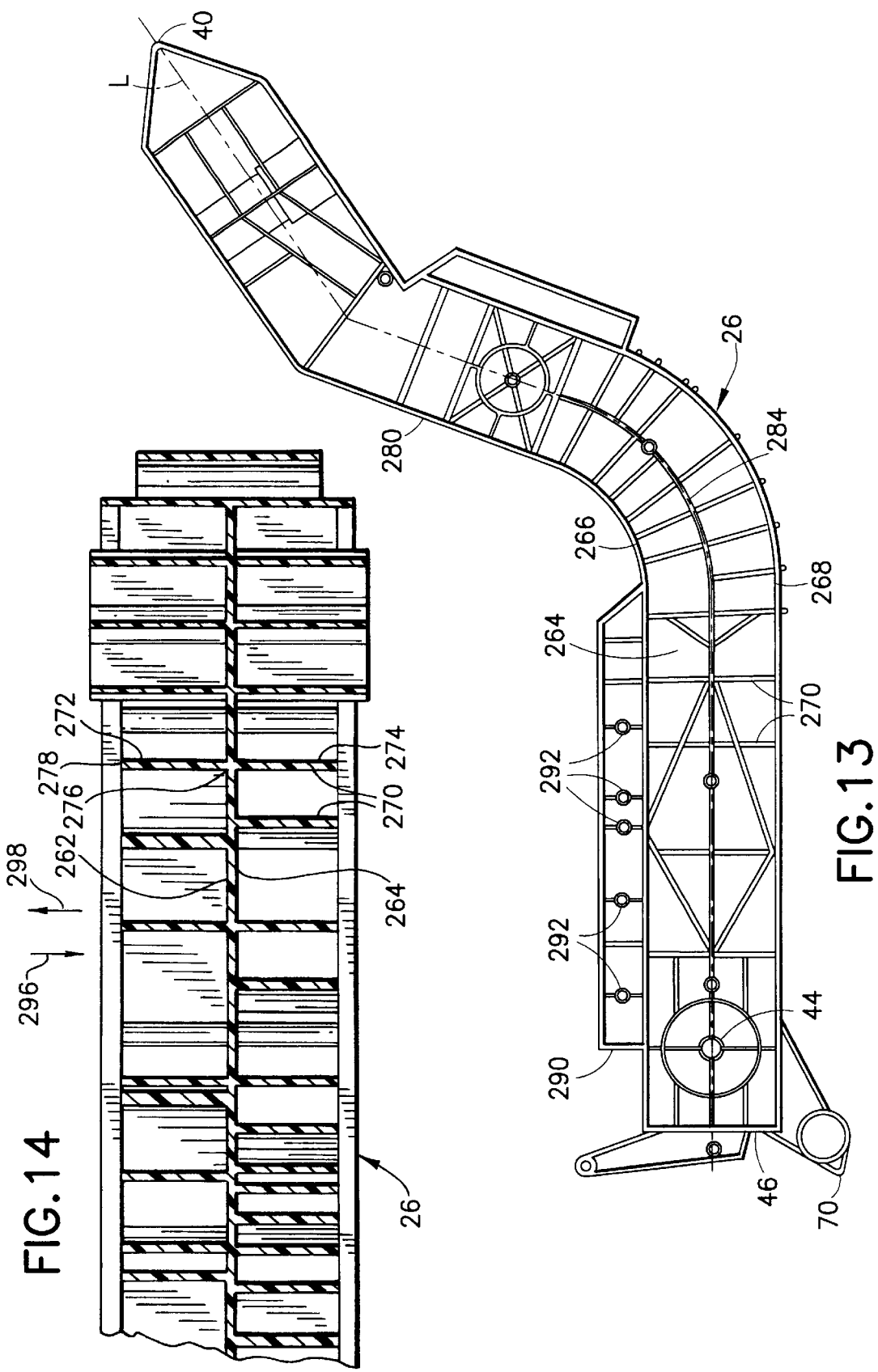

RIDING TOYS AND COMPONENT PARTS THEREOF

BACKGROUND OF THE INVENTION

The present invention relates generally to riding toys for children and pertains, more specifically, to tricycles and component parts for tricycles and other riding toys.

Over the years, riding toys have been made available to children in a very wide variety of wheeled vehicles. In particular, tricycles have enjoyed great popularity and have been manufactured in a number of different configurations, utilizing various materials. More recently, tricycles constructed of molded synthetic polymeric materials have found favor in the marketplace in that these riding toys offer aesthetically attractive designs with economy of cost. Heretofore, the major component parts of most tricycles and similar riding toys constructed of synthetic polymeric materials have been made by blow molding techniques, utilizing synthetic polymeric materials best suited to blow molding. While blow molding offers certain advantages in design and economy, there are drawbacks, especially in the limited choice of materials available for blow molding and in the manufacturing process itself where there is considerable lag time between the placement of orders by customers and the completion of the ordered products for delivery. Such lag time leads to the requirement for maintaining more inventory of finished products on hand, with concomitant increased expense.

SUMMARY OF THE INVENTION

The present invention eliminates the drawbacks of blow molding in the manufacture of major component parts of tricycles, and other riding toys, by enabling the use of injection molding techniques and materials for making these component parts. As such, the present invention attains several objects and advantages, some of which are summarized as follows: Provides tricycles and other riding toys with unique design features and structural arrangements capable of being made by injection molding techniques, utilizing injection molding materials; enables the manufacture of component parts, such as wheels and frames of tricycles as well as other riding toys, utilizing injection molding techniques and materials to construct component parts of relatively high strength and having aesthetically desirable appearance; facilitates the manufacture of major component parts of tricycles, and other riding toys, so as to reduce lag time between orders and delivery, thereby increasing economy; enables an increased variety in the design and construction of component parts available for tricycles, and other riding toys; provides a tricycle with a safety feature for preventing flipping of the tricycle over backwards in response to rearward rotating maneuvers by a rider; renders more practical the availability of a wider variety of designs and construction, utilizing superior materials; provides more rugged riding toys, such as tricycles, of consistent high quality for exemplary performance over a longer service life.

The above objects and advantages, as well as further objects and advantages, are attained by the present invention which may be described briefly as providing, in a riding toy having a front wheel, rear wheels and a frame extending longitudinally between the front wheel and the rear wheels, improvements wherein the front wheel comprises: a central axis and an outer perimeter spaced radially from the central axis; a hub at the central axis; an annular rim coaxial with the hub and spaced radially outwardly from the hub; a plurality of spokes extending generally radially between the hub and the rim for supporting the rim on the hub; an annular tire member integral with the rim, the tire member including an annular front tread extending circumferentially along the outer perimeter of the wheel; an annular wheel web extending generally radially outwardly and extending circumferentially around the wheel radially between the front tread and the rim; and a multiplicity of wheel ribs integral with the wheel web and spaced circumferentially around the wheel web, the wheel ribs extending axially from the wheel web and being integral with the front tread to support the front tread at circumferentially spaced locations around the wheel; the rear wheels each comprise: a central axis, an outer perimeter spaced radially from the central axis, and an interior; a cup-shaped first rear wheel member including a rear tread extending circumferentially around the outer perimeter of the rear wheel and axially between opposite ends, a first hub portion, a first spindle extending from the first hub portion along the central axis, and an opening at one of the opposite ends; a disk-shaped second rear wheel member including a second hub portion, a second spindle extending from the second hub portion along the central axis, and an outer periphery coaxial with the second spindle and having a radial extent sufficient to locate the outer periphery adjacent the rear tread; a plurality of first rear wheel ribs extending radially between the first hub portion and the rear tread to support the rear tread at circumferentially spaced locations around the first rear wheel member; a plurality of second rear wheel ribs extending radially between the second hub portion and the outer periphery of the second rear wheel member; a coupling joining the first and second spindles such that the second rear wheel member closes the opening in the first rear wheel member to close the interior of the rear wheel, with the outer periphery of the second rear wheel member coincident with the first rear wheel member adjacent the rear tread; and a generally cylindrical spacer integral with the disk-shaped member and extending axially along the central axis in a direction away from the interior of the rear wheel; and the frame comprises: a length extending generally along a longitudinal line between a front end and a rear end; a frame web extending along the length between the front end and the rear end, the frame web following the longitudinal line so that the longitudinal line lies in the frame web; a multiplicity of frame ribs integral with the frame web and spaced apart longitudinally along the frame web, the frame ribs extending laterally from the frame web; and at least a first frame flange extending generally parallel to the longitudinal line and extending laterally from the frame web, the first frame flange being integral with the frame web along the length of the frame web and being integral with the frame ribs at the spaced apart locations.

BRIEF DESCRIPTION OF THE DRAWINGS

The invention will be understood more fully, while still further objects and advantages will become apparent, in the following detailed description of preferred embodiments of the invention illustrated in the accompanying drawing, in which:

FIG. 13 is a right side elevational view of the frame; and

FIG. 14 is an enlarged fragmentary cross-sectional view taken along line 14—14 of FIG. 12.

DETAILED DESCRIPTION OF THE INVENTION

Figure 1:
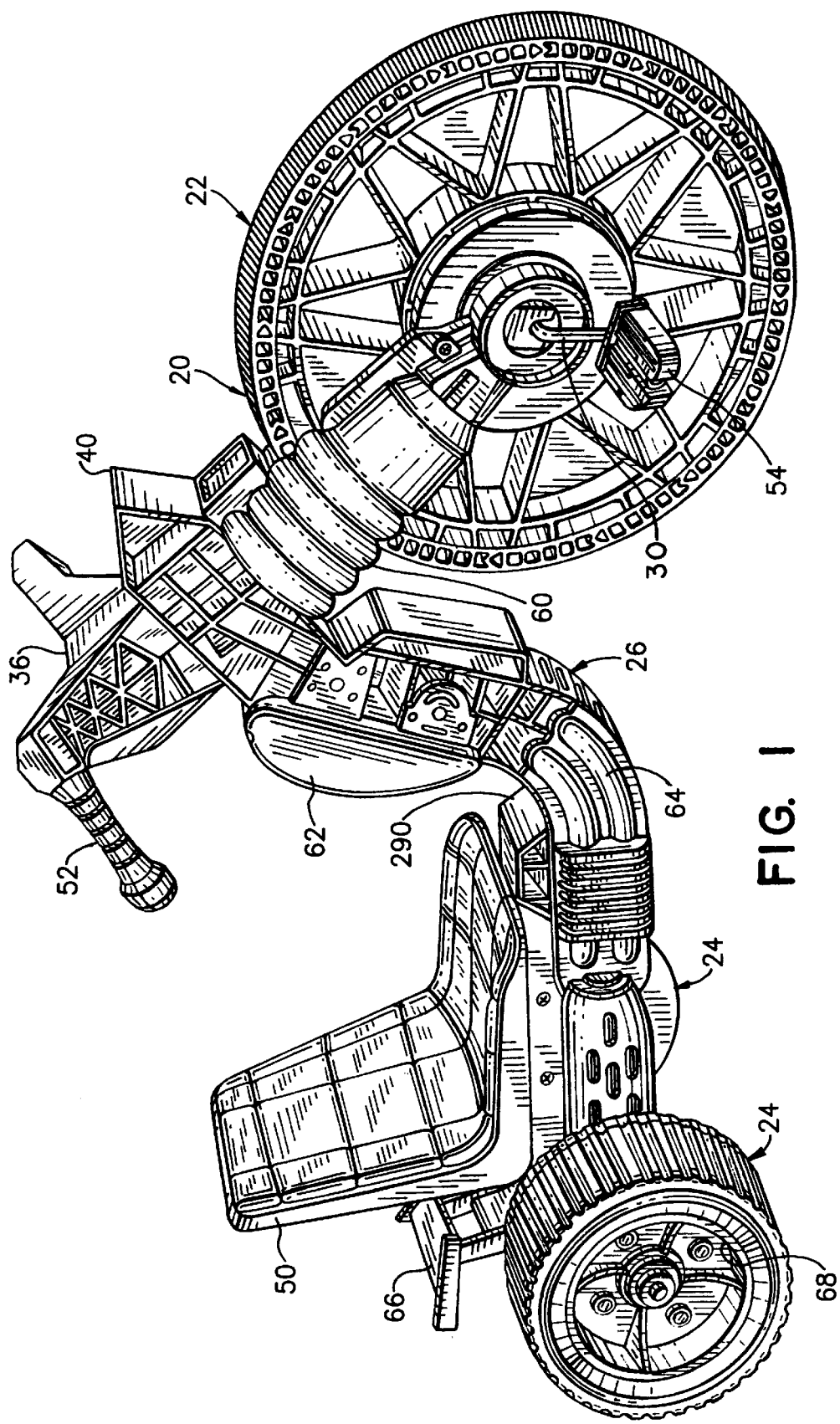
FIG. 1 is a pictorial perspective view of a riding toy in the form of a tricycle having component parts constructed in accordance with the present invention.
Figure 2:
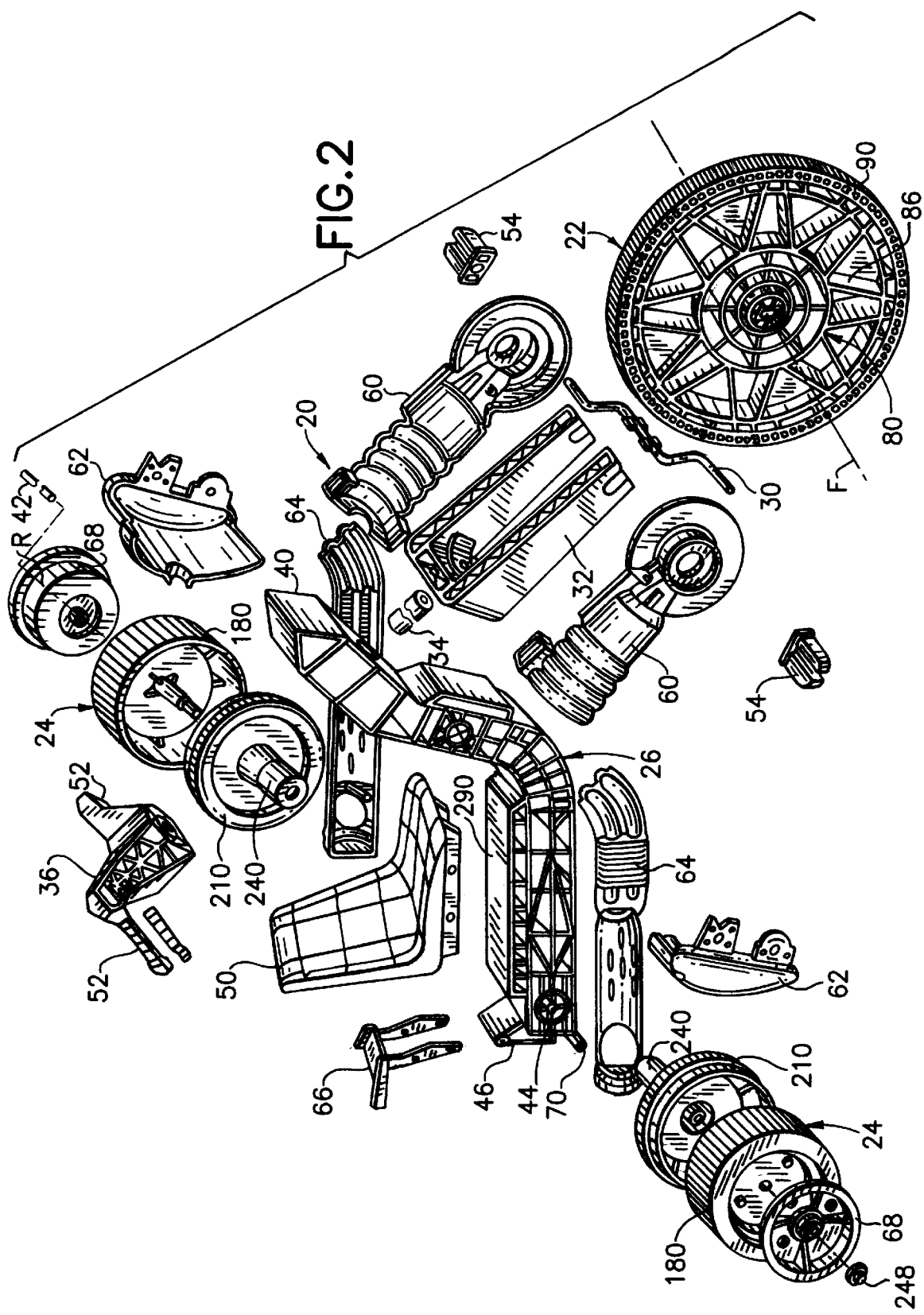
FIG. 2 is an exploded perspective view of the tricycle.
Figure 3:
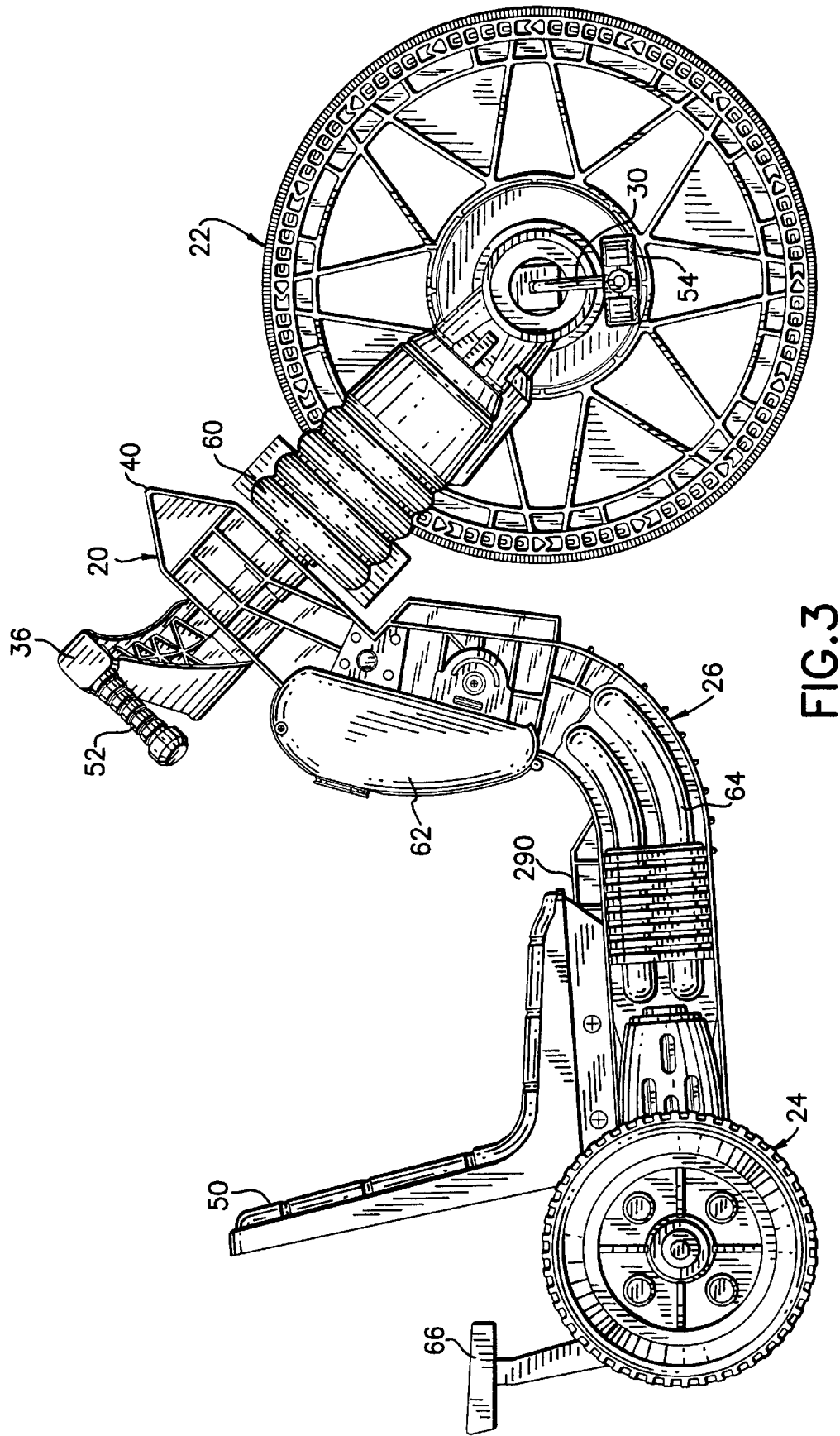
FIG. 3 is a right side elevational view of the tricycle.
Figure 4:
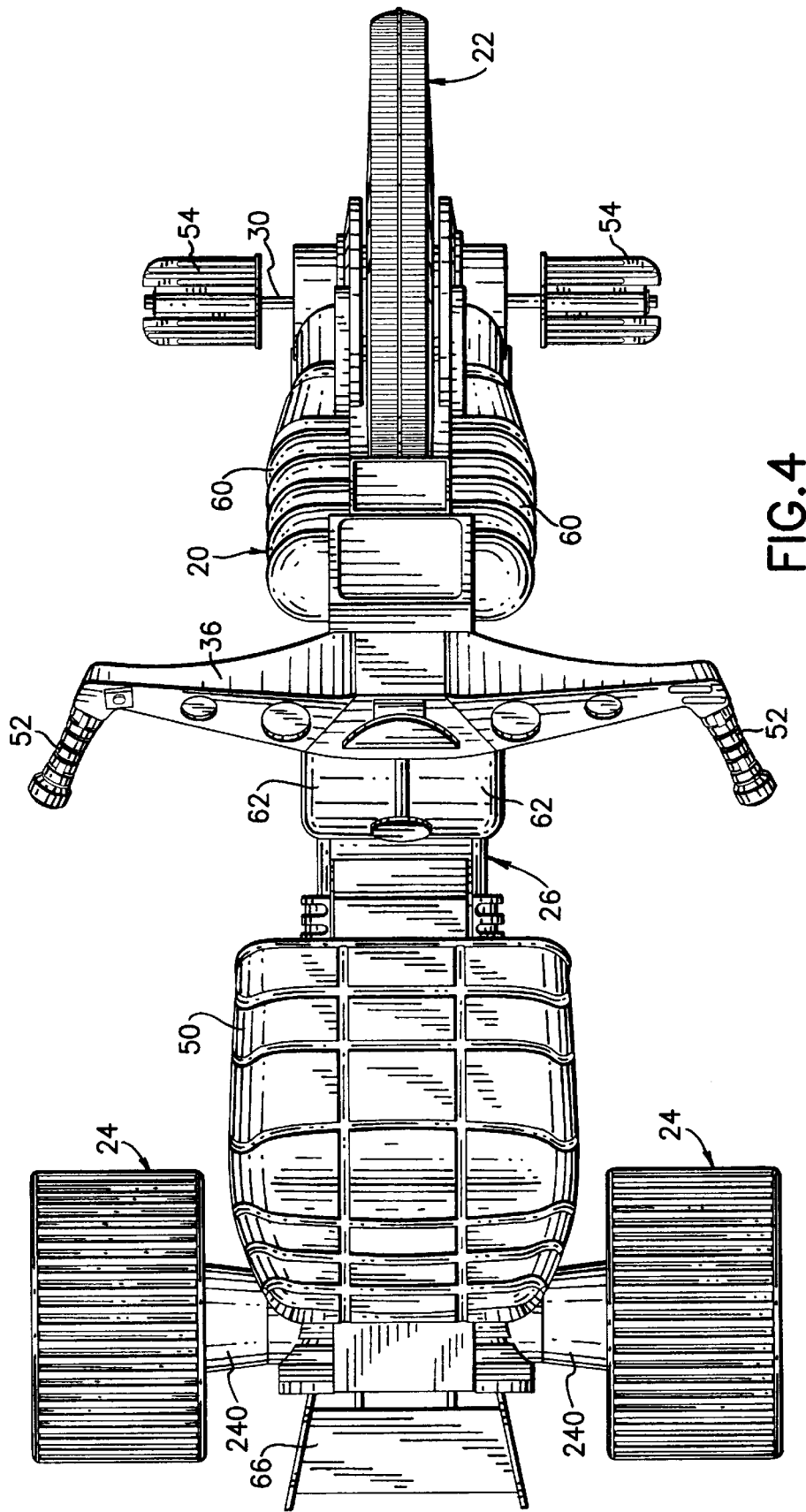
FIG. 4 is a top plan view of the tricycle.
Figure 5:
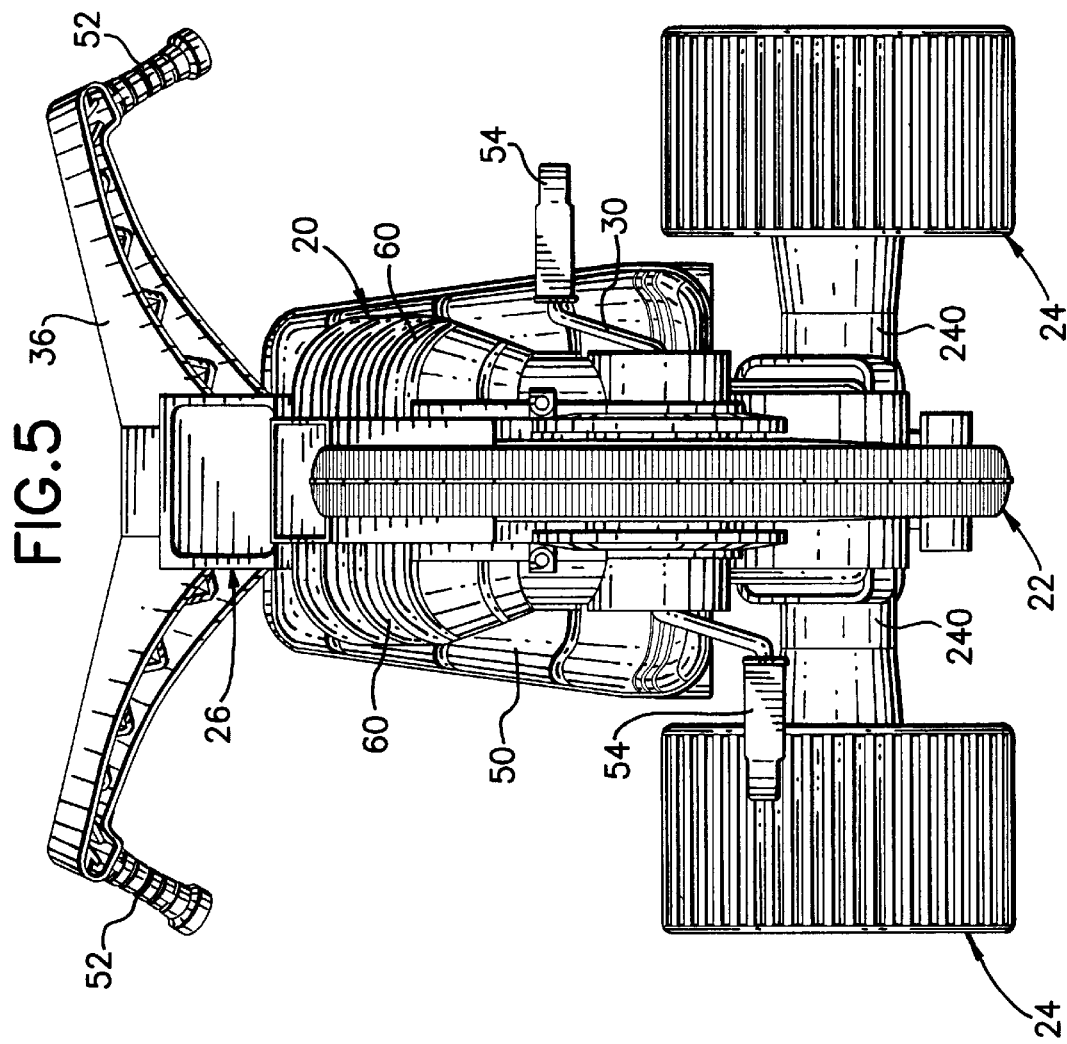
FIG. 5 is a front elevational view of the tricycle.
Figure 6:
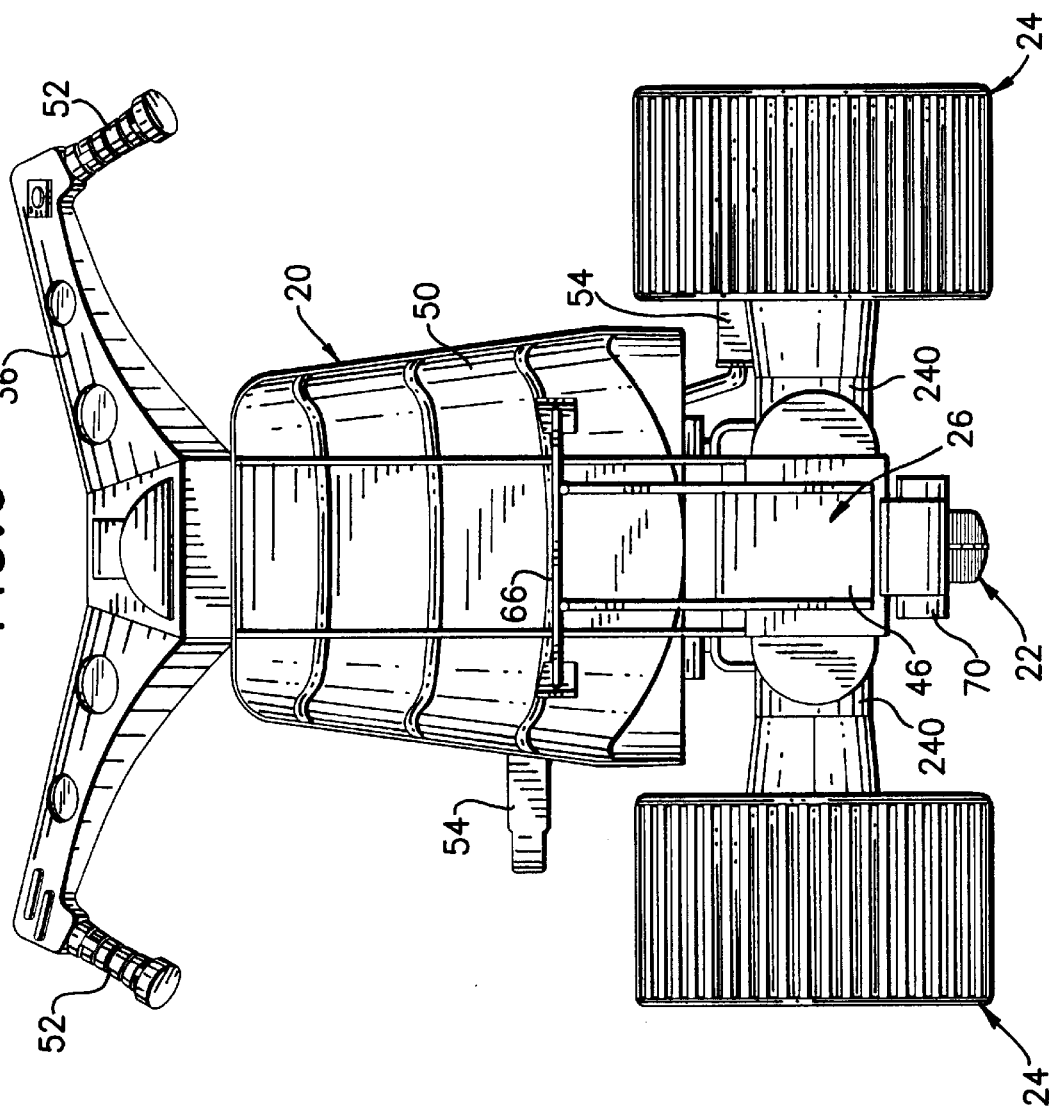
FIG. 6 is a rear elevational view of the tricycle.
Figure 7:
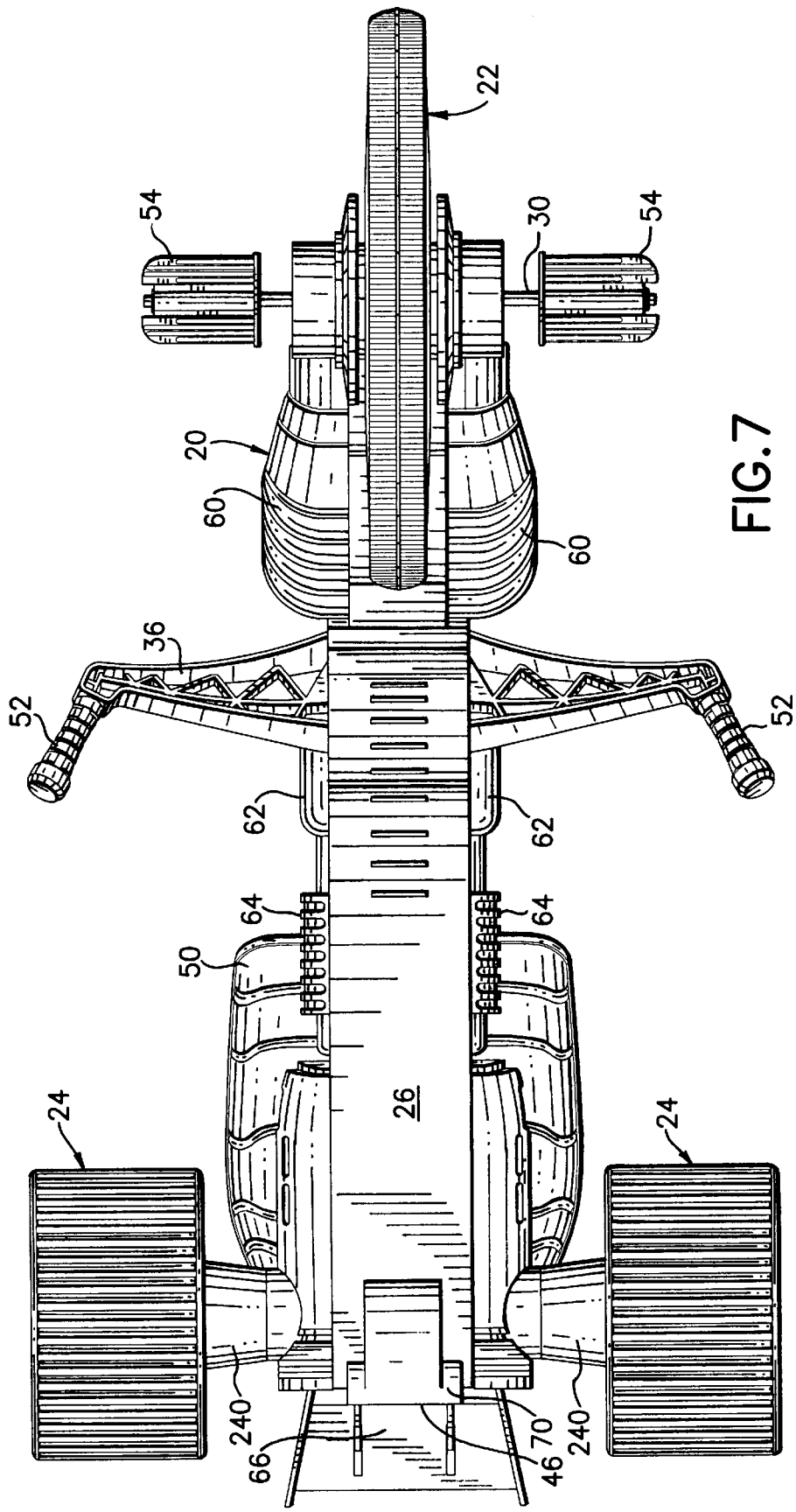
FIG. 7 is a bottom plan view of the tricycle.

Referring now to the drawing, and especially to FIGS. 1 through 7 thereof, a riding toy is shown in the form of a tricycle 20 having component parts constructed in accordance with the present invention. Tricycle 20 has a front wheel 22, rear wheels 24 and a frame 26. The front wheel 22 has a central axis F, and a crank 30 is aligned with the central axis F, passing through the center of the front wheel 22 and captured in a fork 32 to mount the front wheel 22 on the fork 32. The fork 32, in turn, is journaled on the frame 26, by means of a steering shaft 34, for movement in response to actuation of a handlebar 36, the steering shaft 34 being affixed to the handlebar 36 and to the fork 32, and extending between the handlebar 36 and the fork 32 for being journaled in the frame 26, adjacent the front end 40 of the frame 26. The rear wheels 24 are mounted for rotation on an axle 42 which passes through a complementary bushing 44 integral with the frame 26 adjacent the rear end 46 of the frame 26.

A seat 50 is bolted to the frame 26, intermediate the front end 40 and the rear end 46, for carrying a rider (not shown). The rider grasps the handlebar 36, at hand grips 52, engages pedals 54, which are rotatably mounted upon the crank 30, and rotates the front wheel 22 to drive the tricycle 20 forward (or backward, as desired). A plurality of trim pieces are secured to the tricycle 20 for aesthetic purposes, in this instance the trim pieces being designed to simulate a motorized vehicle. Accordingly, the trim pieces include brake disk and shock absorber simulating pieces 60 bolted to the fork 32, gas tank simulating pieces 62 bolted to the frame 26, and exhaust manifold and tuned muffler simulating pieces 64, also bolted to the frame 26. In addition, an airfoil wing 66 is bolted to the frame 26 behind the seat 50, and a wheel cover 68 is fitted to each rear wheel 24, for decorative purposes. As a safety measure, a skid 70 is integral with the frame 26, adjacent the rear end 46 of the frame 26, to prevent the tricycle 20 from flipping over backwards during rearwardly rotating movements induced by the rider, in maneuvers commonly known as "wheelies", thereby deterring injury to the rider. The skid 70 depends downwardly from the frame 26, rearwardly of the axle 42, and is molded unitary with the frame 26.

Figure 8:
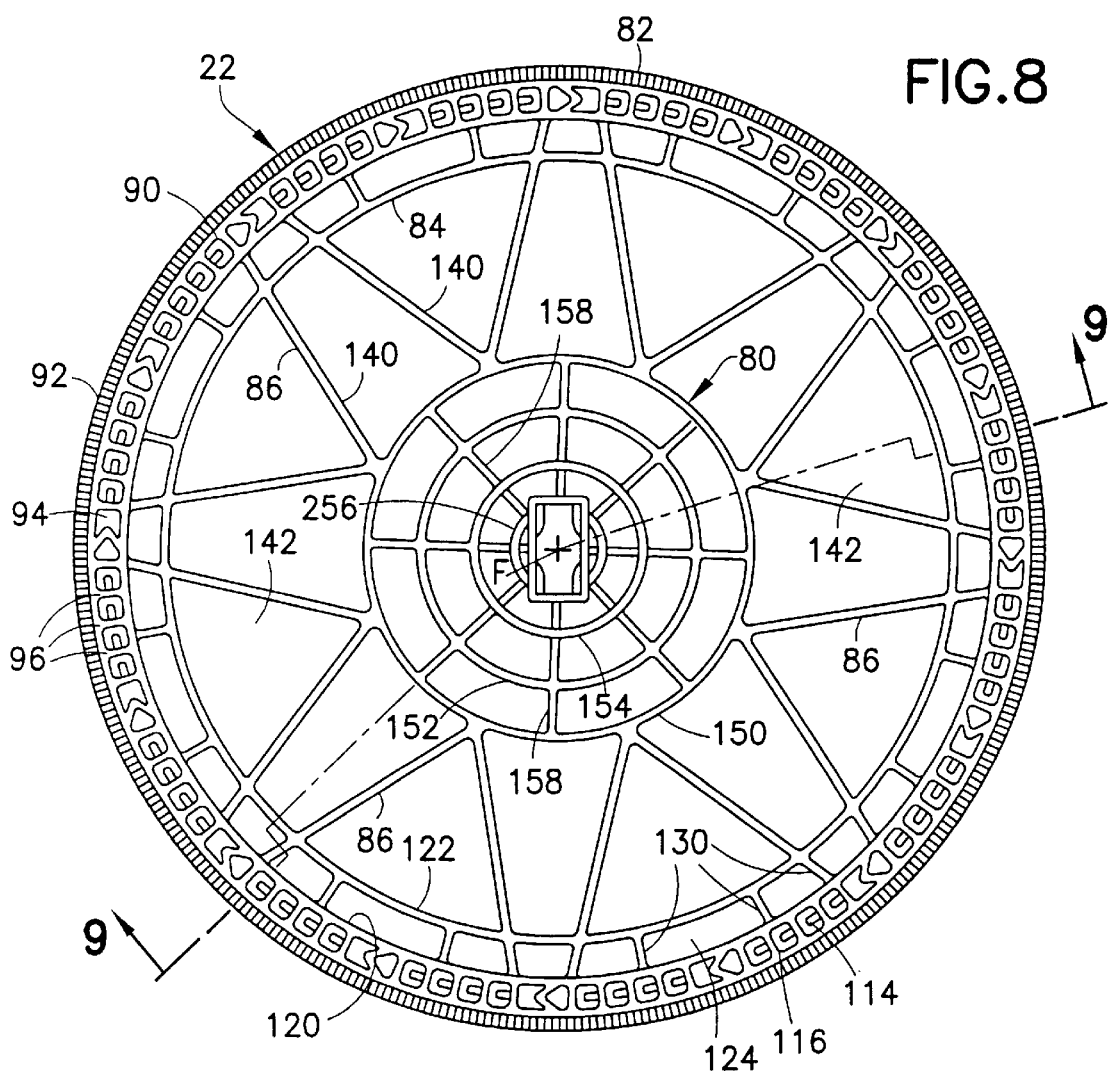
FIG. 8 is a side elevational view of the front wheel of the tricycle.

Turning now to FIG. 8, front wheel 22 most advantageously is constructed of a synthetic polymeric material and has been molded in one piece by injection molding. The structural arrangement of front wheel 22 includes a hub 80 at the central axis F and a circular outer perimeter 82 spaced radially from the central axis F. An annular rim 84 is coaxial with the hub 80 and is spaced radially outwardly from the hub 80, and a plurality of spokes 86 extend generally radially between the hub 80 and the rim 84 for supporting the rim 84 on the hub 80. An annular tire member 90 is integral with the rim 84 and includes an annular front tread 92 extending circumferentially along the outer perimeter 82 of the front wheel 22, and an annular wheel web 94 extending generally radially outwardly and extending circumferentially around the front wheel 22 between the front tread 92 and the rim 84, radially outwardly from the rim 84 to the front tread 92. A multiplicity of wheel ribs 96 are integral with the wheel web 94 at locations spaced circumferentially around the wheel web 94, the wheel ribs 96 extending axially from the wheel web 94 and being integral with the front tread 92 to support the front tread 92 at the circumferentially spaced locations around the front wheel 22.

The annular wheel web 94 extends continuously around the front wheel 22 and includes axially opposite sides 100 and 102, and the wheel ribs 96 include a set of first ribs 104 extending in the axial direction away from side 100 and a set of second ribs 106 extending in the axial direction away from side 102. Each wheel rib 96 includes a root 110 at the wheel web 94 and a remote tip 112. In the preferred construction, the wheel web 94 is centered axially relative to the front tread 92; that is, the wheel web 94 is located centrally between the tips 112 of the wheel ribs 96. Additional support for the front tread 92 is provided by buttresses 114 which extend between almost all of the wheel ribs 96 and the wheel web 94. In addition, the buttresses 114 provide a safety feature in that the buttresses 114 deny entry of a child's finger (not shown) into the spaces 116 between adjacent wheel ribs 96, thereby preventing potential injury which might otherwise occur should a child's finger become caught within the relatively small space 116.

In the preferred construction, rim 84 includes an outer annular flange 120 extending circumferentially around the front wheel 22, contiguous with and integral with the tire member 90, an inner annular flange 122 extending circumferentially around the front wheel 22 and spaced radially inwardly from the outer annular flange 120, and a further annular wheel web 124 extending radially between and interconnecting the outer and inner annular flanges 120 and 122. Further annular wheel web 124 extends continuously around the front wheel 22 and includes axially opposite sides 126 and 128. Further wheel ribs 130 extend in axial directions from the annular wheel web 124, with first wheel ribs 132 extending in one axial direction from side 126 of the wheel web 124 and second wheel ribs 134 extending from side 128 in an opposite axial direction. As before, the wheel web 124 is centered between the wheel ribs 132 and 134.

The spokes 86 include spoke bars 140 extending radially outwardly from the hub 80 to the rim 84. Spoke webs 142 are integral with and are located circumferentially between at least some adjacent spoke bars 140 to provide added support and rigidity, without adding excessive weight. At the same time, the spoke webs 142 provide a pleasing appearance to the front wheel 22. Added support and rigidity, without excessive weight and volume of material, are provided by the preferred construction of hub 80 which includes a plurality of coaxial cylindrical members 150, 152, 154 and 156 spaced apart radially and interconnected with radially-extending hub bars 158.

Figure 9:
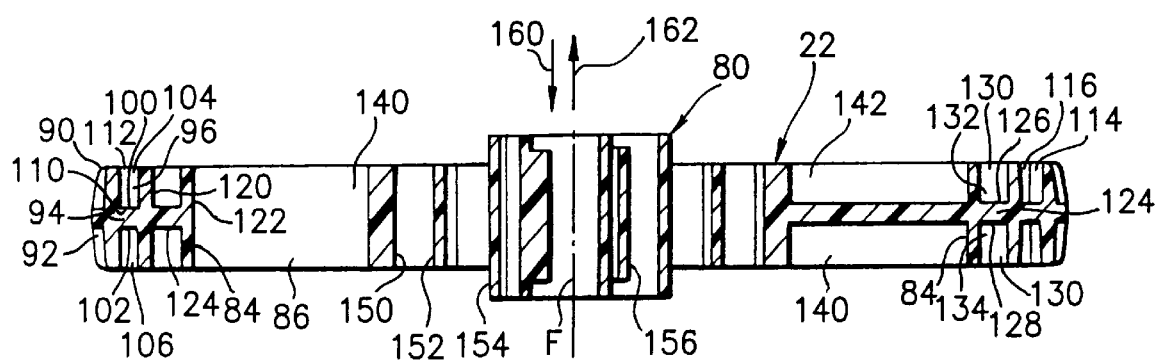
FIG. 9 is a cross-sectional view taken along line 9—9 of FIG. 8.

The above-described construction is especially well-suited to molding the front wheel 22 by injection molding, allowing the use of preferred synthetic polymeric materials, such as copolymer polypropylene and high-density polyethylene. As best seen in FIG. 9, the configuration of front wheel 22 allows injection molding dies (not shown) to be engaged and parted along directions 160 and 162, respectively, in the manufacture of front wheel 22. Thus, front wheel 22 preferably is molded in a single, unitary construction which includes all of the elements of the front wheel 22 joined together in a one-piece construction. The ribbed, webbed and barred construction of the tire member 90, the rim 84 and the hub 80 provides sufficient strength and rigidity for rugged and reliable performance over a long service life. In addition, the construction offers a unique appearance which is both aesthetically appealing and highly distinctive.

Figure 10:
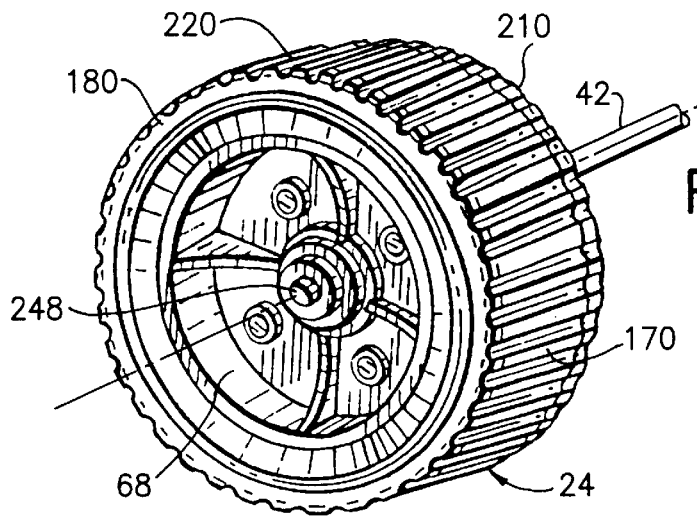
FIG. 10 is a pictorial perspective view of a rear wheel of the tricycle.
Figure 11:
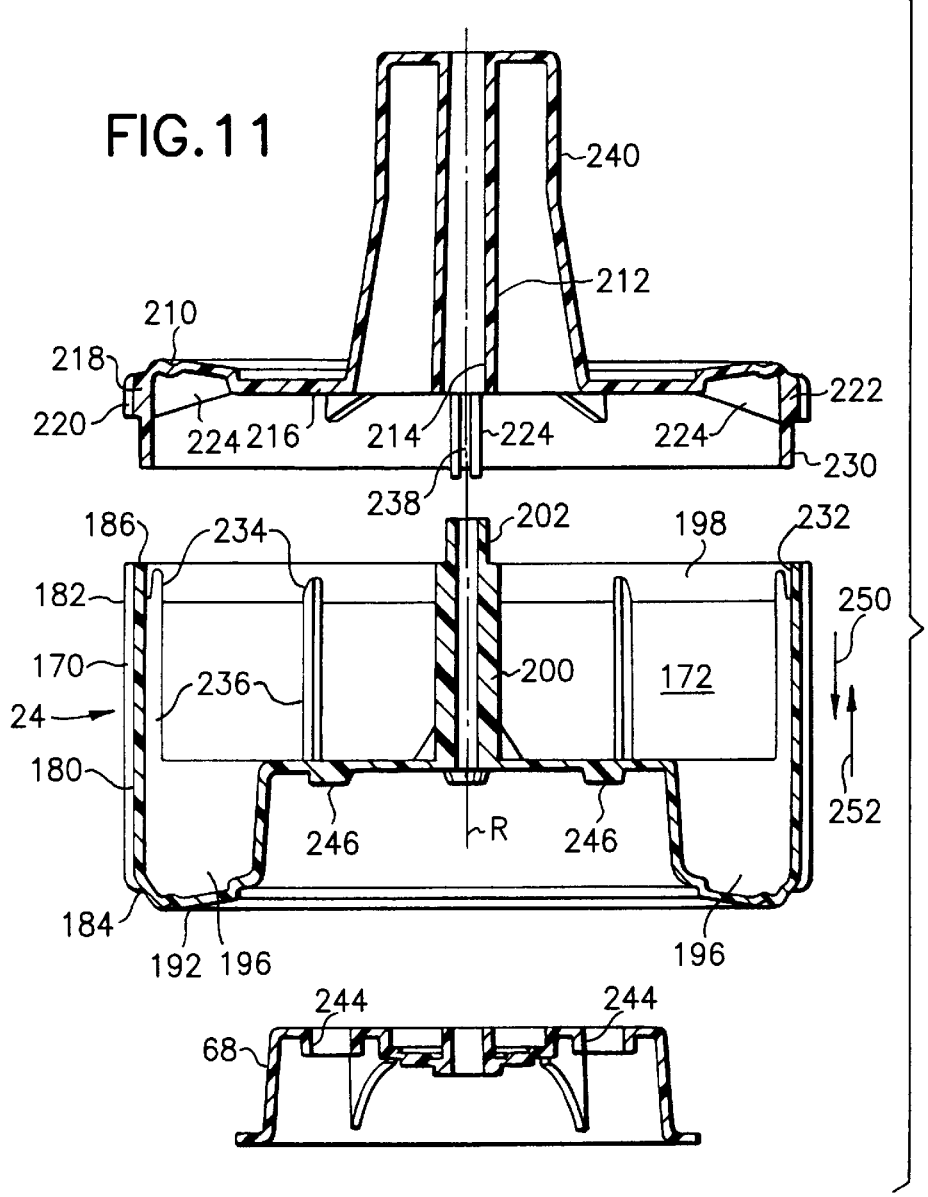
FIG. 11 is an exploded cross-sectional view of the rear wheel.

Referring now to FIGS. 10 and 11, each rear wheel 24 includes a central axis R, an outer perimeter 170, and an interior 172. A first rear wheel member 180 is generally cup-shaped and includes a rear tread 182 extending circumferentially around the outer perimeter 170 of the rear wheel 24, and axially between opposite ends 184 and 186. A hub portion 190 is located adjacent end 184 and is recessed axially within a rear tire portion 192 integral with the rear tread 182, and a plurality of rear wheel ribs 196 extend radially between the hub portion 190 and the rear tread 182 of rear tire portion 192 to lend support to the rear tread 182. An opening 198 is located adjacent end 186. Hub portion 190 carries a first spindle 200 extending along central axis R and terminating at a pin 202. A second rear wheel member 210 is generally disk-shaped and includes a second spindle 212 extending axially along central axis R and terminating in a socket 214 complementary to pin 202 so as to establish a coupling which accurately locates the first rear wheel member 180 relative to the second rear wheel member 210, along central axis R. Second rear wheel member 210 has a hub portion 216 extending radially outwardly to a further rear tire portion 218 and, in the illustrated embodiment, carrying a rear tread portion 220 along the outer periphery 222 of the second rear wheel member 210. A plurality of further rear wheel ribs 224 extend radially between the hub portion 216 and the rear tread portion 220 for supporting the rear tread portion 220.

The first and second rear wheel members 180 and 210 are assembled to establish a completed rear wheel 24 by inserting the pin 202 of the first spindle 200 into the socket 214 of the second spindle 212 to locate and couple together the first and second rear wheel members 180 and 210. The first and second rear wheel members 180 and 210 then are brought together axially, with an axially projecting radially outer portion in the form of annular sleeve 230 integral with the second rear wheel member 210 telescopically fitting into a complementary radially outer portion in the form of annular recess 232 in the first rear wheel member 180, the relative dimensions of the annular sleeve 230 and the annular recess 232 enabling telescoping to join the first and second rear wheel members 180 and 210 to further couple the first and second rear wheel members 180 and 210 and close the opening 198 and the interior 172 of the rear wheel 24. At the same time, at least one, and preferably two, tabs 234 which project axially from axial extensions 236 of the rear wheel ribs 196 are aligned axially with corresponding counterpart slots 238 located at corresponding rear wheel ribs 224 so that upon completion of the insertion of pin 202 into socket 214, and sleeve 230 into recess 232, tabs 234 enter slots 238 to preclude relative rotation between the assembled first and second rear wheel members 180 and 210.

The second rear wheel member 210 includes a generally cylindrical spacer 240 integral with the hub portion 216 and extending axially along the central axis R to project in a direction away from the interior 172 of the rear wheel 24. Once the rear wheels 24 are assembled, as described above, the rear wheels 24 are mounted for rotation upon the frame 26 by receiving the axle 42 within the assembled first and second spindles 200 and 212, and the spacers 240 serve to space the rear wheels 24 axially a prescribed distance from the frame 26. A wheel cover 68 is fitted over each rear wheel 24, the wheel cover 68 including apertures 244 which are registered with complementary projections 246 on the first rear wheel member 180 to assure that the wheel cover 68 is coupled for rotation with the rear wheel 24, and a cap nut 248 is secured over each end of the axle 42 to capture the rear wheels 24 upon the axle 42, for rotation on the axle 42 about axis R.

The above-described construction of the rear wheels 24 is especially well-suited to molding the rear wheels 24 by injection molding, allowing the use of preferred synthetic polymeric materials, such as copolymer polypropylene and high-density polyethylene. As best seen in FIG. 11, the configuration of the rear wheel members 180 and 210, as well as the configuration of the wheel cover 68, enables each of the rear wheel members 180 and 210, as well as the wheel cover 68, to be injection molded in a one-piece, unitary structure and allows injection molding dies (not shown) to be engaged and parted along directions 250 and 252, respectively, in the manufacture of the rear wheels 24. Thus, rear wheels 24 are economically injection molded, rather than being blow molded in the now-conventional manner. The ribbed construction of the rear wheel members 180 and 210 provides sufficient strength and rigidity for rugged and reliable performance over a long service life. In addition, the construction offers a unique appearance which is both aesthetically appealing and highly distinctive.

Figure 12:
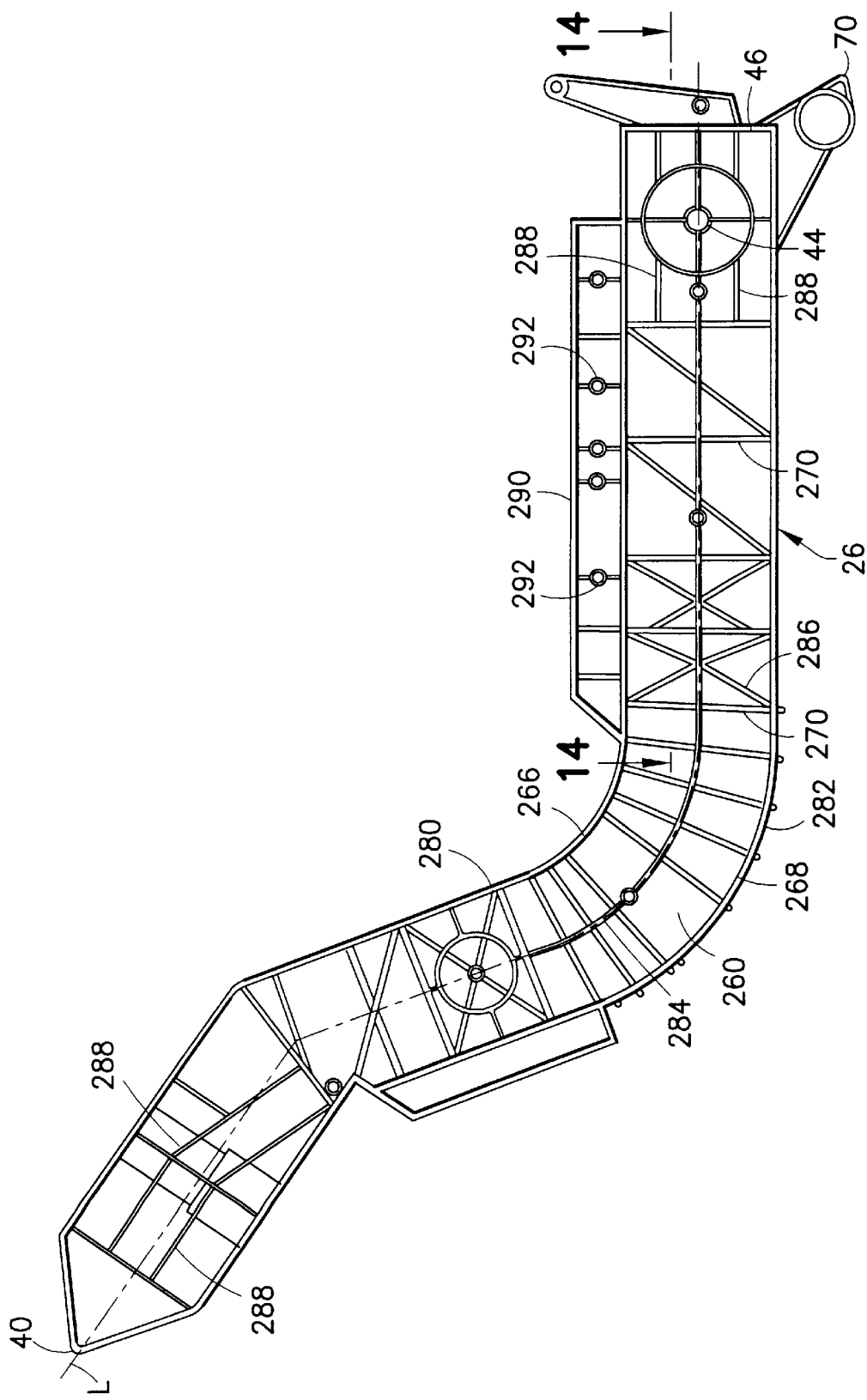
FIG. 12 is a left side elevational view of the frame of the tricycle.

Turning now to FIGS. 12 through 14, frame 26 has a length extending generally along a longitudinal line L between the front end 40 and the rear end 46 of the frame 26. In the preferred design, the line L follows an essentially S-shaped curve lying in the plane of the paper, which plane extends generally longitudinally and altitudinally. The S-shaped curve provides the frame 26 with an S-shaped configuration in the longitudinal and altitudinal plane, enabling the adoption in tricycle 20 of a popular overall design configuration which includes a very large diameter front wheel 22 and relatively much smaller diameter rear wheels 24, as depicted in FIG. 1. A frame web 260 extends continuously along the length of the frame 26, the frame web 260 following the longitudinal line L so that the longitudinal line lies in the frame web 260, with the frame web 260 lying essentially in the altitudinal plane. The frame web 260 includes laterally opposite sides 262 and 264 and altitudinally opposite edges 266 and 268, and a multiplicity of frame ribs 270 are integral with the frame web 260 at longitudinally spaced apart locations along the frame web 260. The frame ribs 270 are integral with the frame web 260 and extend laterally from the frame web 260, with first frame ribs 272 extending from the one side 262 and second frame ribs 274 extending from the other side 264 of the frame web 260. Each frame rib 270 has a root 276 at the frame web 260 and a remote tip 278, and the frame web 260 preferably is centered laterally between the tips 278 of the frame ribs 272 and 274.

A frame flange 280 is located at the edge 266 of the frame web 260 and is integral with the frame web 260 and with the frame ribs 270. Frame flange 280 extends essentially continuously along the frame 26, generally parallel to line L, and extends laterally from the frame web 260, with the frame web 260 centered laterally relative to the frame flange 280. In the preferred construction, the frame web 260, the frame ribs 270, and the frame flange 280 are mutually perpendicular. Another frame flange 282 is integral with frame web 260 and is located at the edge 268 of the frame web 260, altitudinally opposite the frame flange 280, which is located at the edge 266. Frame flange 282 extends longitudinally generally parallel to line L, is integral with frame ribs 270 at the spaced apart locations along the frame 26, and extends laterally from the frame web 260 such that the frame web 260 is essentially centered laterally relative to the frame flange 282. An intermediate frame flange 284 is located altitudinally between the primary frame flanges 280 and 282, is integral with the frame web 260, and extends generally parallel to the primary frame flanges 280 and 282. The combination of the frame web 260 with integral frame ribs 270 and primary frame flanges 280 and 282 provides the frame 26 with a high degree of structural strength and rigidity. The provision of supplemental frame ribs 286 and supplemental frame flanges 288 adds to the strength and rigidity. A seat rail 290 is integral with the frame flange 280 and provides multiple attachment points 292 for alternate selected positions of the seat 50 along the frame 26.

The above-described construction of frame 26 is especially well-suited to molding the frame 26 by injection molding, allowing the use of preferred synthetic polymeric materials, such as copolymer polypropylene and high-density polyethylene. As best seen in FIG. 14, the configuration of frame 26 allows injection molding dies (not shown) to be engaged and parted along directions 296 and 298, respectively, in the manufacture of frame 26. Thus, frame 26 preferably is molded in a single, unitary construction which includes all of the elements of the frame 26 joined together in a one-piece construction. The ribbed and webbed construction of the frame 26 provides sufficient strength and rigidity for rugged and reliable performance over a long service life. In addition, the construction offers a unique appearance which is both aesthetically appealing and highly distinctive.

It will be seen that the present invention attains the several objects and advantages summarized above, namely: Provides tricycles and other riding toys with unique design features and structural arrangements capable of being made by injection molding techniques, utilizing injection molding materials; enables the manufacture of component parts, such as wheels and frames of tricycles as well as other riding toys, utilizing injection molding techniques and materials to construct component parts of relatively high strength and having aesthetically desirable appearance; facilitates the manufacture of major component parts of tricycles, and other riding toys, so as to reduce lag time between orders and delivery, thereby increasing economy; enables an increased variety in the design and construction of component parts available for tricycles, and other riding toys; provides a tricycle with a safety feature for preventing flipping of the tricycle over backwards in response to rearward rotating maneuvers by a rider; renders more practical the availability of a wider variety of designs and construction, utilizing superior materials; provides more rugged riding toys, such as tricycles, of consistent high quality for exemplary performance over a longer service life.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. An improvement in a riding toy having a front wheel, rear wheels and a frame extending longitudinally between the front wheel and the rear wheels, wherein the front wheel comprises:
a central axis and an outer perimeter spaced radially from the central axis;
a hub at the central axis;
an annular rim coaxial with the hub and spaced radially outwardly from the hub;
a plurality of spokes extending generally radially between the hub and the rim for supporting the rim on the hub;
an annular tire member integral with the rim, the tire member including
an annular front tread extending circumferentially along the outer perimeter of the wheel;
an annular wheel web extending generally radially outwardly and extending circumferentially around the wheel radially between the front tread and the rim; and
a multiplicity of wheel ribs integral with the wheel web and spaced circumferentially around the wheel web, the wheel ribs extending axially from the wheel web and being integral with the front tread to support the front tread at circumferentially spaced locations around the wheel;

the rear wheels each comprise:
a central axis, an outer perimeter spaced radially from the central axis, and an interior;
a cup-shaped first rear wheel member including a rear tread extending circumferentially around the outer perimeter of the rear wheel and axially between opposite ends, a first hub portion, a first spindle extending from the first hub portion along the central axis, and an opening at one of the opposite ends;
a disk-shaped second rear wheel member including a second hub portion, a second spindle extending from the second hub portion along the central axis, and an outer periphery coaxial with the second spindle and having a radial extent sufficient to locate the outer periphery adjacent the rear tread;
a plurality of first rear wheel ribs extending radially between the first hub portion and the rear tread to support the rear tread at circumferentially spaced locations around the first rear wheel member;
a plurality of second rear wheel ribs extending radially between the second hub portion and the outer periphery of the second rear wheel member;
a coupling joining the first and second spindles such that the second rear wheel member closes the opening in the first rear wheel member to close the interior of the rear wheel, with the outer periphery of the second rear wheel member coincident with the first rear wheel member adjacent the rear tread; and
a generally cylindrical spacer integral with the disk-shaped member and extending axially along the central axis in a direction away from the interior of the rear wheel; and the frame comprises:
a length extending generally along a longitudinal line between a front end and a rear end;
a frame web extending along the length between the front end and the rear end, the frame web following the longitudinal line so that the longitudinal line lies in the frame web;

a multiplicity of frame ribs integral with the frame web and spaced apart longitudinally along the frame web, the frame ribs extending laterally from the frame web; and at least a first frame flange extending generally parallel to the longitudinal line and extending laterally from the frame web, the first frame flange being integral with the frame web along the length of the frame web and being integral with the frame ribs at the spaced apart locations.

2. The improvement of claim 1 wherein the annular wheel web includes axially opposite sides, and the wheel ribs extend axially from each of the opposite sides of the annular wheel web.

3. The improvement of claim 2 wherein the annular wheel web is essentially centered axially relative to the tread.

4. The improvement of claim 1 including buttresses extending between at least some of the wheel ribs and the annular wheel web.

5. The improvement of claim 1 wherein the annular rim includes:
an outer annular flange integral with the tire member and extending circumferentially around the wheel;
an inner annular flange extending circumferentially around the wheel and spaced radially inwardly from the outer annular flange;
a further annular web extending radially between the outer annular flange and the inner annular flange; and
a plurality of further wheel ribs integral with the further annular web, the outer annular flange and the inner annular flange at locations spaced apart circumferentially around the rim.

6. The improvement of claim 1 wherein the spokes include spoke bars extending from the hub to the rim, and spoke webs located circumferentially between at least some adjacent spoke bars.

7. The improvement of claim 1 wherein the hub includes a plurality of coaxial cylindrical members spaced apart radially, and a plurality of radially-extending hub bars joining together the coaxial cylindrical members.

8. The improvement of claim 1 wherein the front wheel is a unitary structure of injection molded synthetic polymeric material.

9. The improvement of claim 1 wherein the first and second rear wheel members include rear wheel radially outer portions having relative dimensions enabling telescoping of the rear wheel radially outer portions upon joining the first and second spindles.

10. The improvement of claim 1 wherein each of the first and second rear wheel members is a unitary structure injection molded of synthetic polymeric material.

11. The improvement of claim 1 wherein the frame web includes laterally opposite sides, and the frame ribs extend laterally from each of the opposite sides of the frame web.

12. The improvement of claim 11 wherein the frame web is essentially centered laterally between the frame ribs extending from one of the opposite sides of the frame web and the frame ribs extending from the other of the opposite sides of the frame web.

13. The improvement of claim 1 wherein:
the frame web has altitudinally opposite edges;
the first frame flange is located at one of the opposite edges; and
a second frame flange is located at the other of the opposite edges, the second frame flange extending generally parallel to the longitudinal line and extending laterally from the frame web, the second frame flange being integral with the frame web along the length of the frame web and being integral with the frame ribs at the spaced apart locations.

14. The improvement of claim 13 including at least one intermediate frame flange located altitudinally between the first and second frame flanges, the intermediate frame flange extending generally parallel to the longitudinal line and extending laterally from the frame web, the intermediate frame flange being integral with the frame web and being integral with the frame ribs at the spaced apart locations.

15. The improvement of claim 13 wherein the frame web includes laterally opposite sides, and the frame ribs extend laterally from each of the opposite sides of the frame web.

16. The improvement of claim 15 wherein the frame web is essentially centered laterally between the frame ribs extending from one of the opposite sides of the frame web and the frame ribs extending from the other of the opposite sides of the frame web.

17. The improvement of claim 16 wherein the frame web lies essentially in an altitudinal plane, the frame ribs extend generally perpendicular to the altitudinal plane, and the first and second frame flanges extend generally perpendicular to the altitudinal plane.

18. The improvement of claim 1 wherein the longitudinal line follows an essentially S-shaped curve in an altitudinal plane, between the front end and the rear end.

19. The improvement of claim 1 wherein the frame is a unitary structure injection molded of synthetic polymeric material.

20. An improvement in a wheel having a unitary structure adapted for injection molding of synthetic polymeric material, the improvement comprising:
a central axis and an outer perimeter spaced radially from the central axis;
a hub at the central axis;
an annular rim coaxial with the hub and spaced radially outwardly from the hub;
a plurality of spokes extending generally radially between the hub and the rim for supporting the rim on the hub;
an annular tire member integral with the rim, the tire member including
an annular front tread extending circumferentially along the outer perimeter of the wheel;
an annular wheel web extending generally radially outwardly and extending circumferentially around the wheel radially between the front tread and the rim; and
a multiplicity of wheel ribs integral with the wheel web and spaced circumferentially around the wheel web, the wheel ribs extending axially from the wheel web and being integral with the front tread to support the front tread at circumferentially spaced locations around the wheel;
the annular rim including:
an outer annular flange integral with the tire member and extending circumferentially around the wheel;
an inner annular flange extending circumferentially around the wheel and spaced radially inwardly from the outer annular flange;
a further annular web extending radially between the outer annular flange and the inner annular flange; and
a plurality of further wheel ribs integral with the further annular web, the outer annular flange and the inner annular flange at locations spaced apart circumferentially around the rim.

21. The improvement of claim 20 wherein the annular wheel web includes axially opposite sides, and the wheel ribs extend axially from each of the opposite sides of the annular wheel web.

22. The improvement of claim 20 wherein the annular wheel web is essentially centered axially relative to the tread.

23. The improvement of claim 20 including buttresses extending between at least some of the wheel ribs and the annular wheel web.

24. The improvement of claim 20 wherein the spokes include spoke bars extending from the hub to the rim, and spoke webs located circumferentially between at least some adjacent spoke bars.

25. The improvement of claim 20 wherein the hub includes a plurality of coaxial cylindrical members spaced apart radially, and a plurality of radially-extending hub ribs joining together the coaxial cylindrical members.

26. An improvement in a wheel having a two-piece structure adapted for injection molding of synthetic polymeric material, the improvement comprising:

a central axis, an outer perimeter spaced radially from the central axis, and an interior;

a cup-shaped first wheel member including a tread extending circumferentially around the outer perimeter of the wheel and axially between opposite ends, a first hub portion, a first spindle extending along the central axis, and an opening at one of the opposite ends;

a disk-shaped second wheel member including a second hub portion, a second spindle extending along the central axis, and an outer periphery coaxial with the second spindle and having a radial extent sufficient to locate the outer periphery adjacent the tread;

a plurality of first wheel ribs extending radially between the first hub portion and the tread to support the tread at circumferentially spaced locations around the first wheel member;

a plurality of second wheel ribs extending radially between the second hub portion and the outer periphery of the second wheel member;

a coupling joining the first and second spindles such that the second wheel member closes the opening in the first wheel member to close the interior of the wheel, with the outer periphery of the second wheel member coincident with the first wheel member adjacent the tread; and a generally cylindrical spacer integral with the disk-shaped member and extending axially along the central axis in a direction away from the interior of the wheel.

27. The improvement of claim 26 wherein the first and second wheel members include wheel radial outer portions having relative dimensions enabling telescoping of the wheel radially outer portions upon joining the first and second spindles.

28. An improvement in a riding toy frame having a unitary structure adapted for injection molding of synthetic polymeric material, the improvement comprising:

a length extending generally along a longitudinal line between a front end and a rear end;

a frame web extending along the length between the front end and the rear end, the frame web including laterally opposite sides and following the longitudinal line so that the longitudinal line lies in the frame web;

a multiplicity of frame ribs integral with the frame web and spaced apart longitudinally along the frame web, the frame ribs extending laterally from each of the opposite sides of the frame web; and at least a first frame flange extending generally parallel to the longitudinal line and extending laterally from the frame web, the first frame flange being integral with the frame web along the length of the frame web and being integral with the frame ribs at the spaced apart locations;

the frame web being essentially centered laterally between the frame ribs extending from one of the opposite sides of the frame web and the frame ribs extending from the other of the opposite sides of the frame web.

29. The improvement of claim 28 wherein:

the frame web has altitudinally opposite edges;

the first frame flange is located at one of the opposite edges; and a second frame flange is located at the other of the opposite edges, the second frame flange extending generally parallel to the longitudinal line and extending laterally from the frame web, the second frame flange being integral with the frame web along the length of the frame web and being integral with the frame ribs at the spaced apart locations.

30. The improvement of claim 29 including at least one intermediate frame flange located altitudinally between the first and second frame flanges, the intermediate frame flange extending generally parallel to the longitudinal line and extending laterally from the frame web, the intermediate frame flange being integral with the frame web and being integral with the frame ribs at the spaced apart locations.

31. The improvement of claim 30 wherein the frame web lies essentially in an altitudinal plane, the frame ribs extend generally perpendicular to the altitudinal plane, and the first and second frame flanges extend generally perpendicular to the altitudinal plane.

32. The improvement of claim 28 wherein the longitudinal line follows an essentially S-shaped curve in an altitudinal plane, between the front end and the rear end.

33. An improvement in a riding toy having component parts including a front wheel, rear wheels and a frame extending longitudinally between the front wheel and the rear wheels, wherein at least one of the component parts comprises:

a web extending along a first direction and having opposite sides;

a multiplicity of ribs integral with the web and extending from the opposite sides of the web in second directions, at spaced apart locations along the web; and at least a first flange extending along the web in the first direction and extending from the opposite sides of the web in the second directions, the flange being integral with the web and being integral with the ribs at the spaced apart locations;

the ribs including first ribs extending from one of the opposite sides of the web and second ribs extending from the other of the opposite sides of the web, each rib extending between a root integral with the web and a tip spaced away from the web, the web being essentially centered between the tips of the first and second ribs.

34. The improvement of claim 33 wherein the web includes opposite edges and the first flange extends along one of the opposite edges.

35. The improvement of claim 34 including a second flange extending along the other of the opposite edges of the web, the second flange extending along the web in the first direction and extending from the opposite sides of the web in the second directions, the second flange being integral with the web and being integral with the ribs at the spaced apart locations.

36. The improvement of claim 35 wherein the web lies essentially in a plane, the first and second ribs extend generally perpendicular to the plane, and the first and second flanges extend generally perpendicular to the plane.

37. The improvement of claim 36 wherein the at least one component part is a unitary structure of molded synthetic polymeric material.

* * * * *